(12) United States Patent
Allen et al.

(10) Patent No.: US 11,815,173 B1
(45) Date of Patent: Nov. 14, 2023

(54) METHOD AND SYSTEM FOR TRANSMISSION GEAR CONTROL

(71) Applicant: Dana Heavy Vehicle Systems Group, LLC, Maumee, OH (US)

(72) Inventors: James Allen, Atherstone (GB); Jordan M. Houser, Sylvania, OH (US); Nathan Smith, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/055,740

(22) Filed: Nov. 15, 2022

(51) Int. Cl.
 F16H 57/01 (2012.01)
 F16H 61/28 (2006.01)
 F16H 59/68 (2006.01)
 F16H 59/72 (2006.01)

(52) U.S. Cl.
 CPC ............. *F16H 57/01* (2013.01); *F16H 59/68* (2013.01); *F16H 61/2807* (2013.01); *F16H 59/72* (2013.01); *F16H 2057/012* (2013.01); *F16H 2057/016* (2013.01)

(58) Field of Classification Search
 CPC ............... F16H 57/01; F16H 2057/012; F16H 2057/016; F16H 59/68; F16H 59/72; F16H 61/2807; F16D 48/06
 See application file for complete search history.

(56) References Cited

U.S. PATENT DOCUMENTS

| | | | |
|---|---|---|---|
| 8,494,738 B2 | 7/2013 | Lee et al. | |
| 10,220,830 B2 | 3/2019 | Colavincenzo et al. | |
| 2004/0116249 A1* | 6/2004 | Kayano | F16H 3/12 477/109 |
| 2007/0037660 A1 | 2/2007 | Shishido et al. | |
| 2015/0127242 A1* | 5/2015 | Iizuka | F16D 48/02 701/110 |
| 2017/0028843 A1* | 2/2017 | Ogawa | B60K 17/02 |
| 2017/0129490 A1* | 5/2017 | Kuwahara | F16H 61/0437 |
| 2017/0227074 A1* | 8/2017 | Povirk | B60K 25/06 |
| 2018/0134154 A1* | 5/2018 | Shimizu | F16D 21/08 |
| 2020/0047759 A1 | 2/2020 | Kawale et al. | |
| 2021/0239164 A1 | 8/2021 | Hellsing et al. | |

FOREIGN PATENT DOCUMENTS

DE 102008032476 A1 1/2010

* cited by examiner

*Primary Examiner* — Edwin A Young
(74) *Attorney, Agent, or Firm* — McCoy Russell LLP (57) ABSTRACT

Methods and systems for operating a transmission that includes one or more dog clutches are described. In one example, a torque capacity of a gear is estimated from an engagement depth of the dog clutch, and the gear may be held or shifted according to the torque capacity of the gear and a commanded torque.

20 Claims, 6 Drawing Sheets

METHOD AND SYSTEM FOR TRANSMISSION GEAR CONTROL

TECHNICAL FIELD

The present disclosure relates to a method and system for operating an electrified axle of a vehicle. The method may be applied to an electric vehicle that includes an electrified axle and a dog clutch.

BACKGROUND AND SUMMARY

A transmission of a vehicle may include one or more dog clutches to engage and disengage gears. The dog clutch may include teeth that mesh with teeth of a gear. The f dog clutch is mechanically coupled to a shaft and gear is mechanically coupled to a second shaft. The gear may be engaged by meshing the teeth of the dog clutch to teeth of the gear. Once the teeth of the dog clutch and the gear are meshing, the gear rotates at a same speed as the dog clutch and the shaft that is coupled to the dog clutch. There is no slip between the dog clutch teeth and the gear teeth. This allows efficient torque transfer between the shaft and the gear via the dog clutch. Additionally, heating of the transmission may also be lower as compared to transmissions that include friction clutches because there is no slip in the dog clutch. However, since the dog clutch and the gear rotate at equal speeds when the dog clutch is engaged, it may be difficult to determine the amount of torque that may be transferred between the dog clutch and the gear. Therefore, it may be difficult to determine whether or not the gear is degraded.

The inventors herein have recognized the above-mentioned issues and have developed a vehicle system, comprising: a transmission including a dog clutch and a gear, the dog clutch including dog clutch teeth, the gear including gear teeth that may be selectively engaged to the dog clutch teeth; and a controller including executable instructions that when executed cause the controller to selectively indicate degradation of the gear according to a commanded torque being greater than a torque capacity of the gear.

By comparing a commanded torque to a torque capacity of a transmission gear, it may be possible to determine whether or not the transmission gear is degraded. Further, in one example, a depth of dog clutch engagement may be the basis for determining a torque capacity of a gear since the torque capacity of the gear is dependent on the measure of contact between a dog clutch and the gear. As such, if the dog clutch does not engage the gear at a tooth depth that is sufficient to provide a gear capacity that meets or exceeds a commanded torque, then the gear may be deemed degraded for its lack of capacity to meet or exceed the commanded torque.

The present description may provide several advantages. In particular, the approach provides a way of determining torque capacity of a dog clutch. Further, the approach may determine whether or not a gear is operating in a degraded state. In addition, the approach may take mitigating actions in response to a degraded gear so that the transmission may continue to operate.

It is to be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
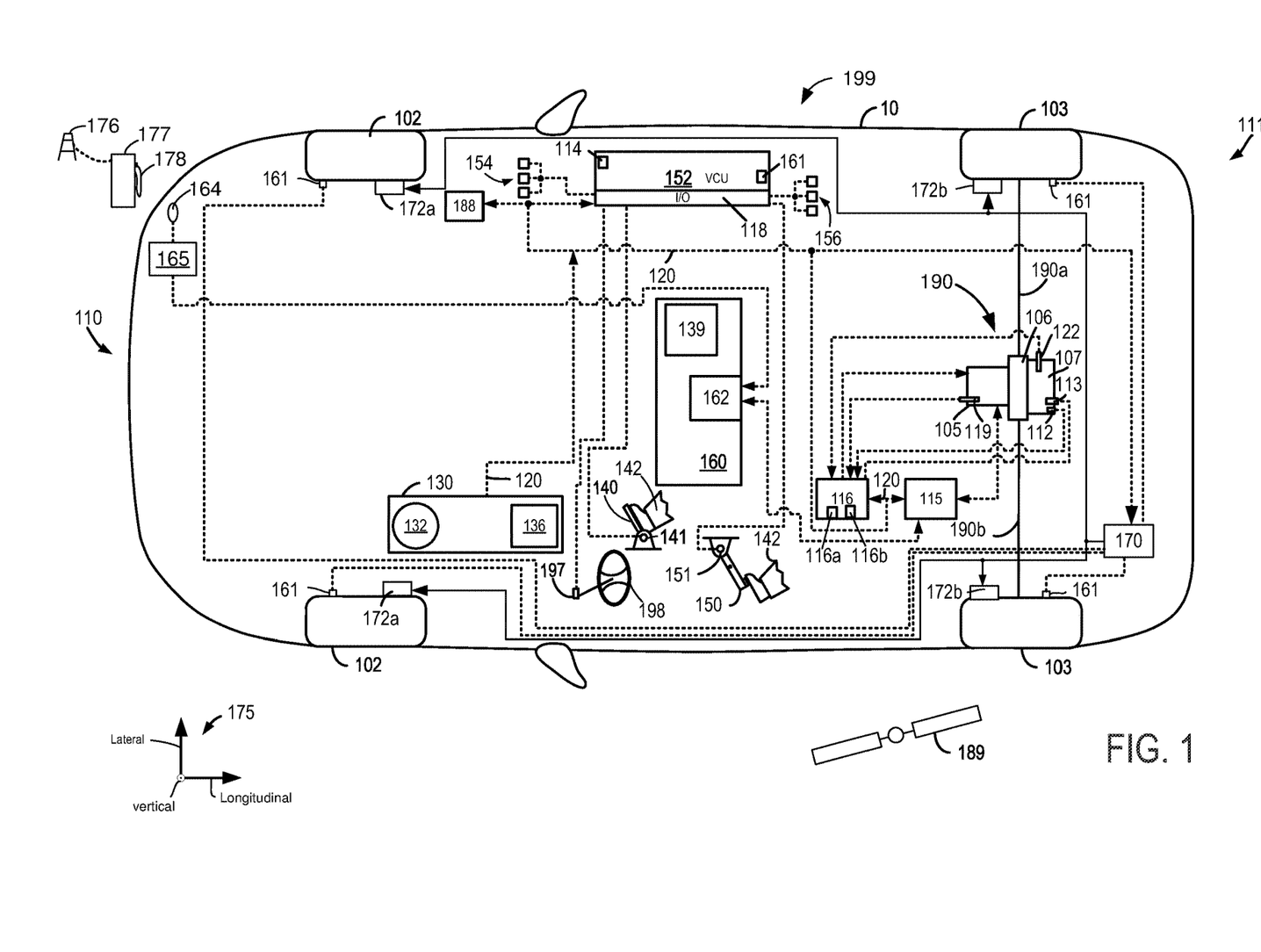
FIG. 1 is an illustration of an example vehicle that includes an electrified axle.
Figure 2:
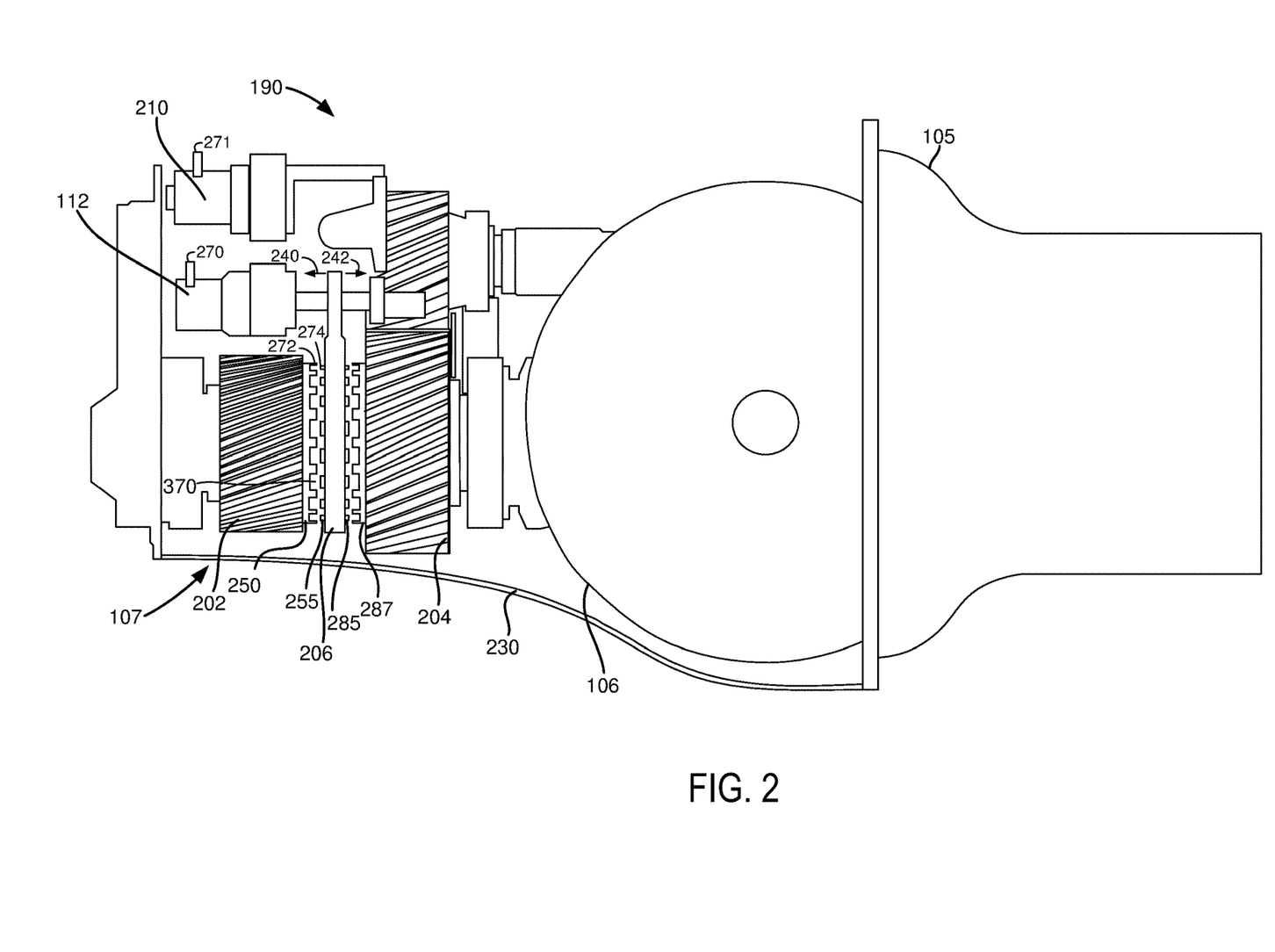
FIG. 2 shows a cut-away longitudinal view of an example electrified axle.
Figure 3:
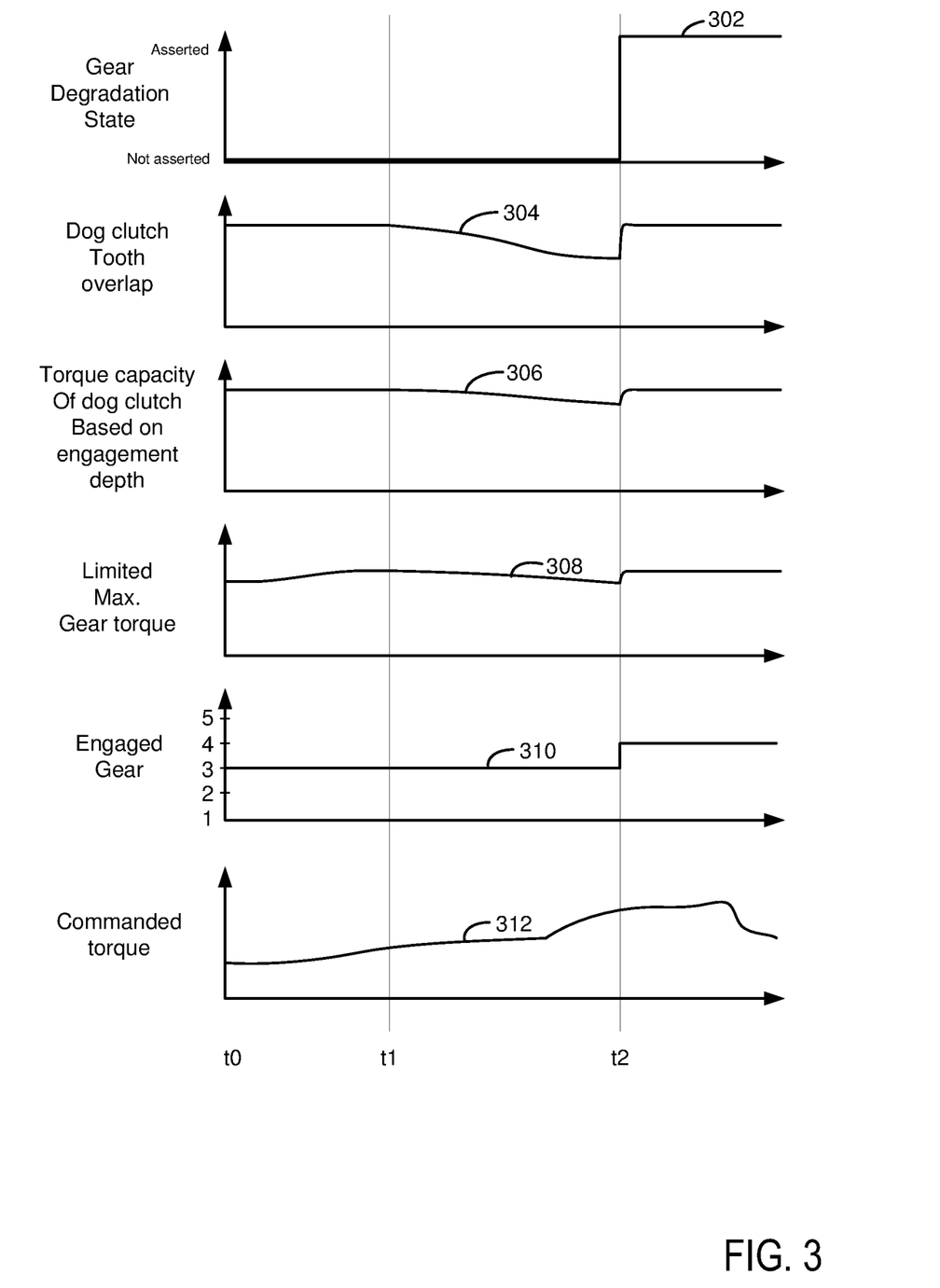
FIG. 3 shows an operating sequence for a transmission according to the method of FIGS. 4-6.

A method and system for operating a transmission is described. In one example, the transmission may be included in an electrified axle. The method and system may estimate a maximum engagement depth for a dog clutch that engages a gear of the transmission. The maximum engagement depth allows for an amount of tooth overlap to be estimated and the amount of tooth overlap may be indicative of a gears capacity to transfer torque from an input shaft of the transmission to an output shaft of the transmission. The transmission may be included in a vehicle of the type that is shown in FIG. 1. The transmission may include gears and dog clutches as shown in FIG. 2. The transmission may be operated as shown in the sequence of FIG. 3 according to the method of the flow charts of FIGS. 4-6.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 includes a propulsion source 105 (e.g., an electric machine), but in other examples two or more propulsion sources may be provided. In one example, propulsion source 105 may be an electric machine that operates as a motor or generator. The propulsion source 105 is fastened to the electrified axle 190. In FIG. 1 mechanical connections between the various components are illustrated as solid lines, whereas electrical connections between various components are illustrated as dashed lines.

Vehicle propulsion system 199 includes an electrified axle 190 (e.g., an axle that includes an integrated electric machine that provides propulsive effort for the vehicle). Electrified axle 190 may include two half shafts, including a first or right haft shaft 190*a* and a second or left half shaft 190*b*. Vehicle 10 further includes front wheels 102 and rear wheels 103. In other examples, the vehicle's propulsion source may be an internal combustion engine.

The electrified axle 190 may be an integrated axle that includes differential gears 106, gear set 107, and propulsion source 105. Electrified axle 190 may include a first speed sensor 119 for sensing a speed of propulsion source 105, a second speed sensor 122 for sensing a speed of an output shaft (not shown), a first clutch actuator 112, and a clutch position sensor 113. Electric power inverter 115 is electrically coupled to propulsion source 105. An axle control unit 116 is electrically coupled to sensors and actuators of electrified axle 190.

Propulsion source 105 may transfer mechanical power to or receive mechanical power from gear set 107. As such, gear set 107 may be a multi-speed gear set that may shift between gears when commanded via axle control unit 116. Axle control unit 116 includes a processor 116a and memory 116b. Memory 116b may include read only memory, random access memory, and keep alive memory. Gear set 107 may transfer mechanical power to or receive mechanical power from differential gears 106. Differential gears 106 may transfer mechanical power to or receive mechanical power from rear wheels 103 via right half shaft 190a and left half shaft 190b. Propulsion source 105 may consume alternating current (AC) electrical power provided via electric power inverter 115. Alternatively, propulsion source 105b may provide AC electrical power to electric power inverter 115. Electric power inverter 115 may be provided with high voltage direct current (DC) power from electric energy storage device 160 (e.g., a traction battery or a traction capacitor). Electric power inverter 115 may convert the DC electrical power from electric energy storage device 160 into AC electrical power for propulsion source 105. Alternatively, electric power inverter 115 may be provided with AC power from propulsion source 105. Electric power inverter 115 may convert the AC electrical power from propulsion source 105 into DC power to store in electric energy storage device 160.

Electric energy storage device 160 may periodically receive electrical energy from a power source such as a stationary power grid 176 via charging station 177 and charging cable 178. The stationary power grid 176 and the charging station 177 reside external to the vehicle (e.g., not part of the vehicle). As a non-limiting example, vehicle propulsion system 199 may be configured as a plug-in electric vehicle (EV), whereby electrical energy may be supplied to electric energy storage device 160 via the power grid 176. Vehicle 10 includes a receptacle 164 for receiving charge. Receptacle 164 is electrically coupled to electric power converter 165. Electric power converter 165 may convert AC to DC or DC to DC. Electric power converter is in electrical communication with electric energy storage device 160 such that electric energy storage device 160 may receive DC power from electric power converter 165.

Electric energy storage device 160 may include an electric energy storage device controller 139 and an electrical power distribution box 162. Electric energy storage device controller 139 may provide charge balancing between energy storage element (e.g., battery cells) and communication with other vehicle controllers (e.g., vehicle control unit 152).

Vehicle 10 may include a vehicle control unit (VCU) controller 152 that may communicate with electric power inverter 115, axle control unit 116, friction or foundation brake controller 170, global positioning system (GPS) 188, and dashboard 130 and components included therein via controller area network (CAN) 120. VCU 152 includes memory 114, which may include read-only memory (ROM or non-transitory memory) and random access memory (RAM). VCU also includes a digital processor or central processing unit (CPU) 161, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not limited to lateral accelerometers, longitudinal accelerometers, yaw rate sensors, inclinometers, temperature sensors, electric energy storage device voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and brake pedal position sensor 151. Actuators may include but are not limited to inverters, transmission controllers, display devices, human/machine interfaces, friction braking systems, and electric energy storage device controller described herein.

Driver demand pedal position sensor 141 is shown coupled to driver demand pedal 140 for determining a degree of application of driver demand pedal 140 by human 142. Brake pedal position sensor 151 is shown coupled to brake pedal 150 for determining a degree of application of brake pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system may also include a dashboard 130 that an operator of the vehicle may interact with. Dashboard 130 may include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to activate and/or deactivate operation of the vehicle driveline (e.g., propulsion components between the propulsion source 105 and wheels 103) based on an operator input. Further, an operator may request an axle mode (e.g., park, reverse, neutral, drive) via the operator interface. Various examples of the operator interface 136 may include interfaces that require a physical apparatus, such as a key, that may be inserted into the operator interface 136 to activate the electrified axle 190 and propulsion source 105 and to turn on the vehicle 10 or may be removed to shut down the electrified axle and propulsion source 105 to turn off vehicle 10. Electrified axle 190 and propulsion source 105 may be activated via supplying electric power to propulsion source 105 and/or electric power inverter 115. Electrified axle 190 and electric machine may be deactivated by ceasing to supply electric power to electrified axle 190 and propulsion source 105 and/or electric power inverter 115. Still other examples may additionally or optionally use a start/stop button that is manually pressed by the operator to start or shut down the electrified axle 190 and propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle controller 152 to activate the electrified axle 190 including an inverter and electric machine. Spatial orientation of vehicle 10 is indicated via axes 175.

Vehicle 10 is also shown with a foundation or friction brake controller 170. Friction brake controller 170 may selectively apply and release friction brakes 172a/172b via allowing hydraulic fluid to flow to friction brakes 172a/172b. Friction brakes 172a/172b may be applied and released so as to avoid locking to front wheels 102 and rear wheels 103. Wheel position or speed sensors 161 may provide wheel speed data to friction brake controller 170. Vehicle propulsion system 199 may provide torque to rear wheels 103 to propel vehicle 10.

A human or autonomous driver may request a driver demand torque, or alternatively a driver demand power, via applying driver demand pedal 140 or via supplying a driver demand wheel torque/power request to vehicle controller 152. Vehicle controller 152 may then demand a torque or power from propulsion source 105 via commanding axle control unit 116. Axle control unit 116 may command electric power inverter 115 to deliver the driver demand torque/power via electrified axle 190 and propulsion source 105. Electric power inverter 115 may convert DC electrical power from electric energy storage device 160 into AC power and supply the AC power to propulsion source 105. Propulsion source 105 rotates and transfers torque/power to gear set 107. Gear set 107 may supply torque from propulsion source 105 to differential gears 106, and differential gears 106 transfer torque from propulsion source 105 to rear wheels 103 via half shafts 190a and 190b.

During conditions when the driver demand pedal is fully released, vehicle controller 152 may request a small negative or regenerative braking power to gradually slow vehicle 10 when a speed of vehicle 10 is greater than a threshold speed. The amount of regenerative braking power requested may be a function of driver demand pedal position, electric energy storage device state of charge (SOC), vehicle speed, and other conditions. If the driver demand pedal 140 is fully released and vehicle speed is less than a threshold speed, vehicle controller 152 may request a small amount of positive torque/power from propulsion source 105, which may be referred to as creep torque or power. The creep torque or power may allow vehicle 10 to remain stationary when vehicle 10 is on a positive grade.

The human or autonomous driver may also request a negative or regenerative driver demand braking torque, or alternatively a driver demand braking power, via applying brake pedal 150 or via supplying a driver demand braking power request to vehicle control unit 152. Vehicle controller 152 may request that a first portion of the driver demanded braking power be generated via electrified axle 190 and propulsion source 105 via commanding axle control unit 116. Additionally, vehicle controller 152 may request that a portion of the driver demanded braking power be provided via friction brakes 172 via commanding friction brake controller 170 to provide a second portion of the driver requested braking power.

After vehicle controller 152 determines the braking power request, vehicle controller 152 may command axle control unit 116 to deliver the portion of the driver demand braking power allocated to electrified axle 190. Electric power inverter 115 may convert AC electrical power generated by propulsion source 105 into DC power for storage in electric energy storage device 160. Propulsion source 105 may convert the vehicle's kinetic energy into AC power.

Axle control unit 116 includes predetermined transmission gear shift schedules whereby fixed ratio gears of gear set 107 may be selectively engaged and disengaged. Shift schedules stored in axle control unit 116 may select gear shift points or conditions as a function of driver demand wheel torque and vehicle speed. Axle control unit 116 may selectively engage and disengage one or more dog clutches shown in FIG. 2 to shift gears and change a gear ratio between propulsion source 105 and rear wheels 103.

Referring now to FIG. 2, a perspective cut-away view of electrified axle 190 is shown. A cut-away section of electrified axle 190 in the longitudinal direction of vehicle 10 is shown.

In this view, part of axle housing 230 has been cut-away to show gear set 107. In one example, gear set 107 is a four ratio or four speed gear set. However, in other examples, gear set 107 may include a different number of gear ratios, two for example. Gear set 107 may be shifted via a first clutch actuator 112, which is configured to engage and disengage a first gear 202 and a second gear 204. First clutch actuator 112 may engage the first gear 202 via moving shifting fork 206 in the direction that is indicated by arrow 240. First clutch actuator 112 may also engage the second gear 204 via moving shifting fork 206 in the direction that is indicated by arrow 242. In FIG. 2, shifting fork 206 is positioned between the first gear 202 and the second gear 204 in a neutral position where neither the first gear 202 nor the second gear 204 is engaged. Shifting fork 206 may engage the first gear 202 via moving first dog clutch 255 in the direction indicated by arrow 240 so that teeth 274 of first dog clutch 255 engage teeth 272 of first gear 202. The first dog clutch 255 rotates at a speed of a shaft (not shown) that is directly coupled to propulsion source 105. First dog clutch 255 may be coupled to the shaft via splines (not shown). The first gear 202 may be coupled to a shaft and the teeth of first gear rotate as a same speed as the shaft that is coupled to first gear 202. First gear 202 may rotate at a different speed than first dog clutch 255 when first dog clutch 255 is disengaged from first gear 202. First gear 202 rotates at a same speed as first dog clutch 255 when first dog clutch 255 is engaged to first gear 202.

First clutch actuator 112 may also selectively engage second gear 204 via moving in the direction that is indicated by arrow 242. Similar to first dog clutch 255, a second dog clutch 285 may engage the second gear 204 via moving the second dog clutch 285 in the direction indicated by arrow 242 so that teeth of the second dog clutch 285 engage teethed of the second gear 204. a first half engages a second half 287 of the second dog clutch 285. The second dog clutch 285 rotates at a speed of the shaft (not shown) that is directly coupled to propulsion source 105. The second dog clutch 285 may be coupled to the shaft via splines (not shown). The second gear 204 may be coupled to a shaft and the teeth of second gear rotate as a same speed as the shaft that is coupled to second gear 204. Second gear 204 may rotate at a different speed than second dog clutch 285 when second dog clutch 285 is disengaged from second gear 204. second gear 204 rotates at a same speed as second dog clutch 285 when second dog clutch 285 is engaged to second gear 204.

Propulsion source 105 is rotationally coupled to first gear 202, differential gears 106, wheel hub 220, and wheel 103 of FIG. 1 when first dog clutch 255 is engaged. Similarly, propulsion source 105 is rotationally coupled to second gear 204, differential gears 106, wheel hub 220, and wheel 103 of FIG. 1 when second dog clutch 285 is engaged. Position sensor 270 senses a position of first clutch actuator 112 which is indicative of the engagement depth of first dog clutch 225 and second dog clutch 285. Output of position sensor 270 is input to controller 116 of FIG. 1.

Second clutch actuator 210 may selectively engage a third gear and a fourth gear in a way that is similar to the way the first clutch actuator 112 selectively engages and disengages the first gear 202 and the second gear 204. Position sensor 271 senses a position of second clutch actuator 210 which is indicative of the engagement depth of third dog clutch and fourth dog clutch (not shown). Output of position sensor 271 is input to controller 116 of FIG. 1.

Shifting fork 206 is shown in a center position where first gear 202 is not engaged by first dog clutch 255 and where and second gear 204 is not engaged by second dog clutch 285. Teeth 274 of first dog clutch 255 is separated from teeth 272 of first gear 202 such that there is a gap between teeth 274 and teeth 272. It may be desirable to reduce or eliminate the gap before torque is transferred between the first dog clutch 255 and first gear 202. Likewise, teeth of second dog clutch 285 are separated from teeth of second gear 204 while shifting fork 206 is in the center or neutral position.

Thus, the system of FIG. 1 provides for a vehicle system, comprising: a transmission including a dog clutch and a gear, the dog clutch including dog clutch teeth, the gear including gear teeth that may be selectively engaged to the dog clutch teeth; and a controller including executable instructions that when executed cause the controller to selectively indicate degradation of the gear according to a commanded torque being greater than a torque capacity of the gear. In a first example, the vehicle system includes wherein the commanded torque is based on a driver demand. In a second example that may include the first example, the vehicle system includes wherein the commanded torque is input to the gear via an electric machine. In a third example that may include one or both of the first and second examples, the vehicle system includes wherein the torque capacity of the gear includes an offset torque. In a fourth example that may include one or more of the first through third examples, the vehicle system includes wherein the torque capacity of the gear is based on a depth of engagement of the dog clutch teeth with the gear teeth. In a fifth example that may include one or more of the first through fourth examples, the vehicle system includes wherein the torque capacity of the gear increases as the depth of engagement increases. In a sixth example that may include one or more of the first through fifth examples, the vehicle system includes wherein the torque capacity of the gear is further based on a temperature. In a seventh example that may include one or more of the first through fifth examples, the vehicle system includes wherein the temperature is an oil temperature.

The system of FIG. 1 also provides for a vehicle system, comprising: a transmission including a dog clutch and a gear, the dog clutch including dog clutch teeth, the gear including gear teeth that may be selectively engaged to the dog clutch teeth; and a controller including executable instructions that when executed cause the controller to shift the transmission in response to a commanded torque being greater than a torque capacity of the gear. In a first example, the vehicle system further comprises estimating a maximum engagement depth of the dog clutch in response to a vehicle being electrically coupled to a stationary power grid. In a second example that may include the first example, the vehicle system further comprises estimating a maximum engagement depth of the dog clutch while a vehicle is moving. In a third example that may include one or both of the first and second examples, the vehicle system includes where the torque capacity of the gear is based on an engagement depth of the dog clutch. In a fourth example that may include one or more of the first through third examples, the vehicle system includes where the engagement depth of the dog clutch is based on a maximum engagement depth.

Referring now to FIG. 3, a prophetic vehicle operating sequence is shown. The operating sequence of FIG. 3 may be provided via the system of FIG. 1 in cooperation with the methods of FIGS. 4-6. The vertical lines at times t0-t2 represent times of interest during the operating sequence. The plots are time aligned.

The first plot from the top of FIG. 3 is a plot of a gear degradation state (e.g., a state of gear degradation) versus time. The vertical axis represents the gear degradation state and the gear is determined to be degraded (e.g., having less than a threshold amount of torque transferring capacity) when trace 302 is at a lower level that is near the horizontal axis. The gear is determined to not degraded when trace 302 is at a higher level that is near the vertical axis arrow. The horizontal axis represents time and time increases from the left side of the plot to the right side of the plot. Trace 302 represents the gear degradation state.

The second plot from the top of FIG. 3 is a plot of dog clutch tooth overlap (e.g., area of contact between teeth of dog clutch and the teeth of the engaged gear) for the engaged gear versus time. The vertical axis represents the amount (e.g., area) of dog clutch tooth overlap for the engaged gear and the amount of overlap (e.g., the area of tooth overlap) increases in the direction of the vertical axis arrow. The horizontal axis represents time and time increases from the left side of the plot to the right side of the plot. Trace 304 represents the dog clutch tooth overlap amount.

The third plot from the top of FIG. 3 is a plot of a maximum torque capacity of an engaged gear based on an engagement depth of the dog clutch versus time. The vertical axis represents the maximum torque capacity of an engaged gear based on an engagement depth of the dog clutch and the maximum torque capacity of the engaged gear increases in the direction of the vertical axis arrow. The horizontal axis represents time and time increases from the left side of the plot to the right side of the plot. Trace 306 represents the maximum torque capacity of an engaged gear based on an engagement depth of the dog clutch.

The fourth plot from the top of FIG. 3 is a plot of a limited maximum transmission gear torque capacity (e.g., a maximum transmission gear torque capacity that has been limited to a value that is equal to or less than the maximum transmission gear torque capacity in response to operating conditions) for the engaged gear versus time. The vertical axis represents the limited maximum transmission gear torque capacity for the engaged gear and the limited transmission gear torque capacity increases in the direction of the vertical axis arrow. The horizontal axis represents time and time increases from the left side of the plot to the right side of the plot. Trace 308 represents the limited maximum transmission gear torque capacity.

The fifth plot from the top of FIG. 3 is a plot of an engaged transmission gear versus time. The vertical axis represents the numerical value of the engaged transmission gear. The horizontal axis represents time and time increases from the left side of the plot to the right side of the plot. Trace 310 represents the numerical value of the engaged transmission gear.

The sixth plot from the top of FIG. 3 is a plot of a commanded driver demand torque versus time. The vertical axis represents the commanded driver demand torque and the amount of driver demand torque increases in the direction of the vertical axis arrow. The horizontal axis represents time and time increases from the left side of the plot to the right side of the plot. Trace 312 represents the amount of commanded driver demand torque (e.g., the amount of torque that the driveline is commanded or requested to provide at the input of the transmission or another position along the driveline).

At time t0, the vehicle is moving (not shown) and the commanded torque is at a lower level. The presently engaged gear is third gear and it is not deemed to be degraded. The dog clutch tooth overlap is large and the maximum torque capacity of the engaged gear is high. The limited maximum gear torque is also at a higher level.

Between time t0 and time t1, the presently engaged gear is not degraded and the dog clutch tooth overlap area is unchanged. The maximum torque capacity of the engaged gear is unchanged and the limited maximum gear torque increases in response to a reduction of temperature in transmission fluid oil temperature. The engaged gear remains third gear and the commanded torque increases by a small amount.

At time t1, the amount of dog clutch tooth overlap begins to be decreased while the engaged transmission gear is not degraded. The maximum torque capacity of the engaged gear begins to decrease as the dog clutch tooth overlap amount decreases. The limited maximum gear torque of the engaged gear also begins to decrease. The engaged gear is third gear and the commanded torque is at a middle level.

Between time t1 and time t2, the presently engaged gear is not degraded and the dog clutch tooth overlap area continues to be decreased. The maximum torque capacity of the engaged gear is also decreased and the limited maximum gear torque decreases as the torque capacity of the dog clutch decreases. The engaged gear remains third gear and the commanded torque increases.

At time t2, the commanded torque capacity exceeds the limited maximum torque capacity of the engaged gear. Therefore, gear degradation is asserted and the transmission shifts to fourth gear so that a new gear may transfer the commanded torque. Upon shifting into fourth gear (now the engaged gear), the amount of dog tooth overlap for the engaged gear increases as does the maximum torque capacity for the engaged gear. The limited maximum gear torque for the engaged gear also increases since the engagement depth of the dog clutch increases. The engaged gear is now fourth gear and the commanded torque is at an increased level.

Thus, if the commanded torque exceeds the limited maximum gear torque of the engaged gear, then a gear may be deemed degraded and the transmission may be shifted to an alternative gear that may transfer the commanded torque. It should be noted that this example shows an upshift in response to the commanded torque exceeding the limited maximum gear torque, the transmission may downshifted in some examples.

Figure 4:
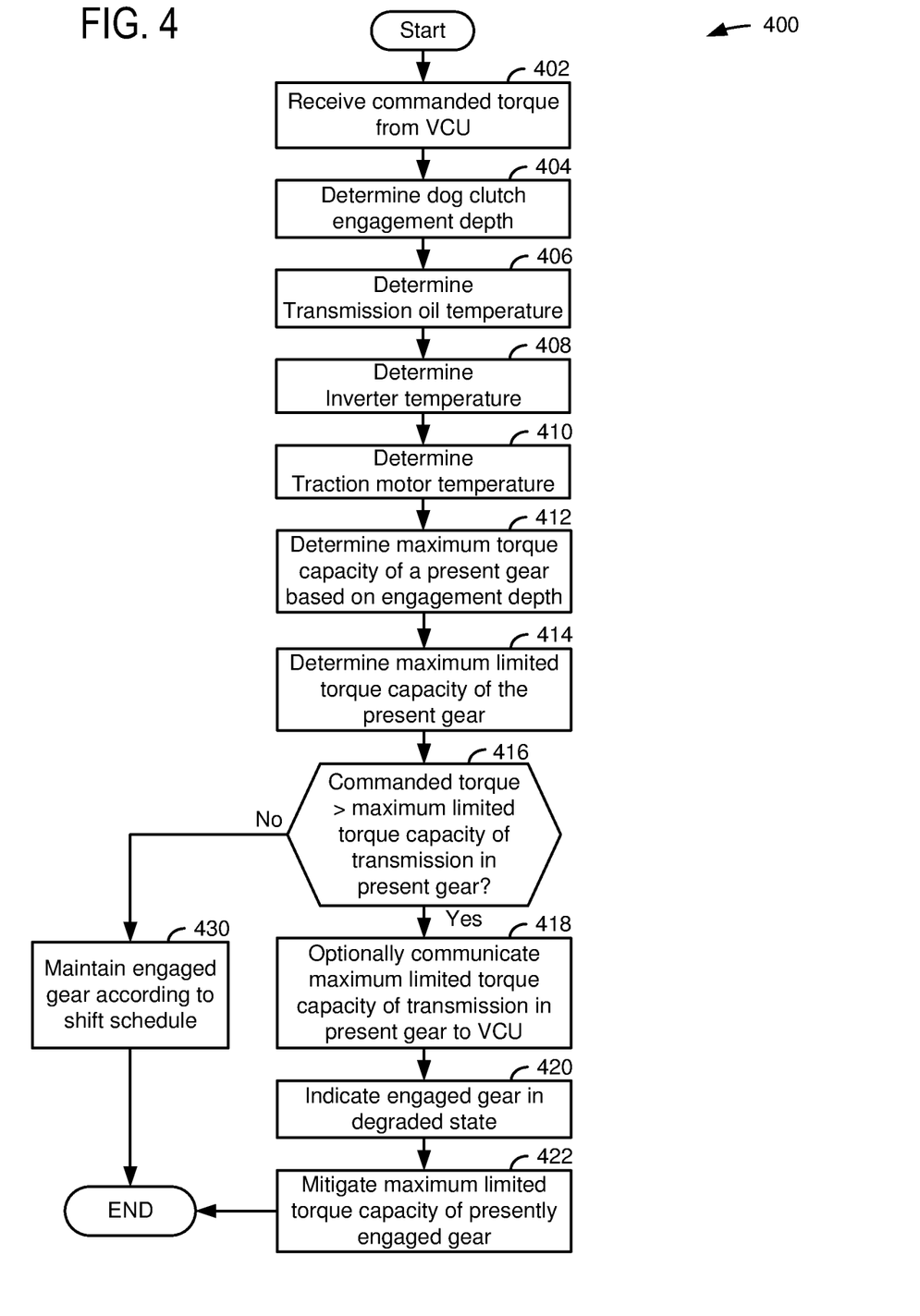
FIGS. 4 and 5 show flowcharts of a method for operating a transmission.

Referring now to FIG. 4, a method for operating a vehicle is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide the operating sequence shown in FIG. 3.

At 402, method 400 receives a commanded torque from a vehicle controller. The commanded torque may be a torque that the vehicle's electric machine is commanded to provide. Alternatively, the commanded torque may be a wheel torque (e.g., torque generated at a vehicle wheel) and the electric machine may be commanded to a torque that is adjusted for gear ratios between the electric machine and the wheels and that provides the commanded wheel torque. Method 400 proceeds to 404.

Figure 5:
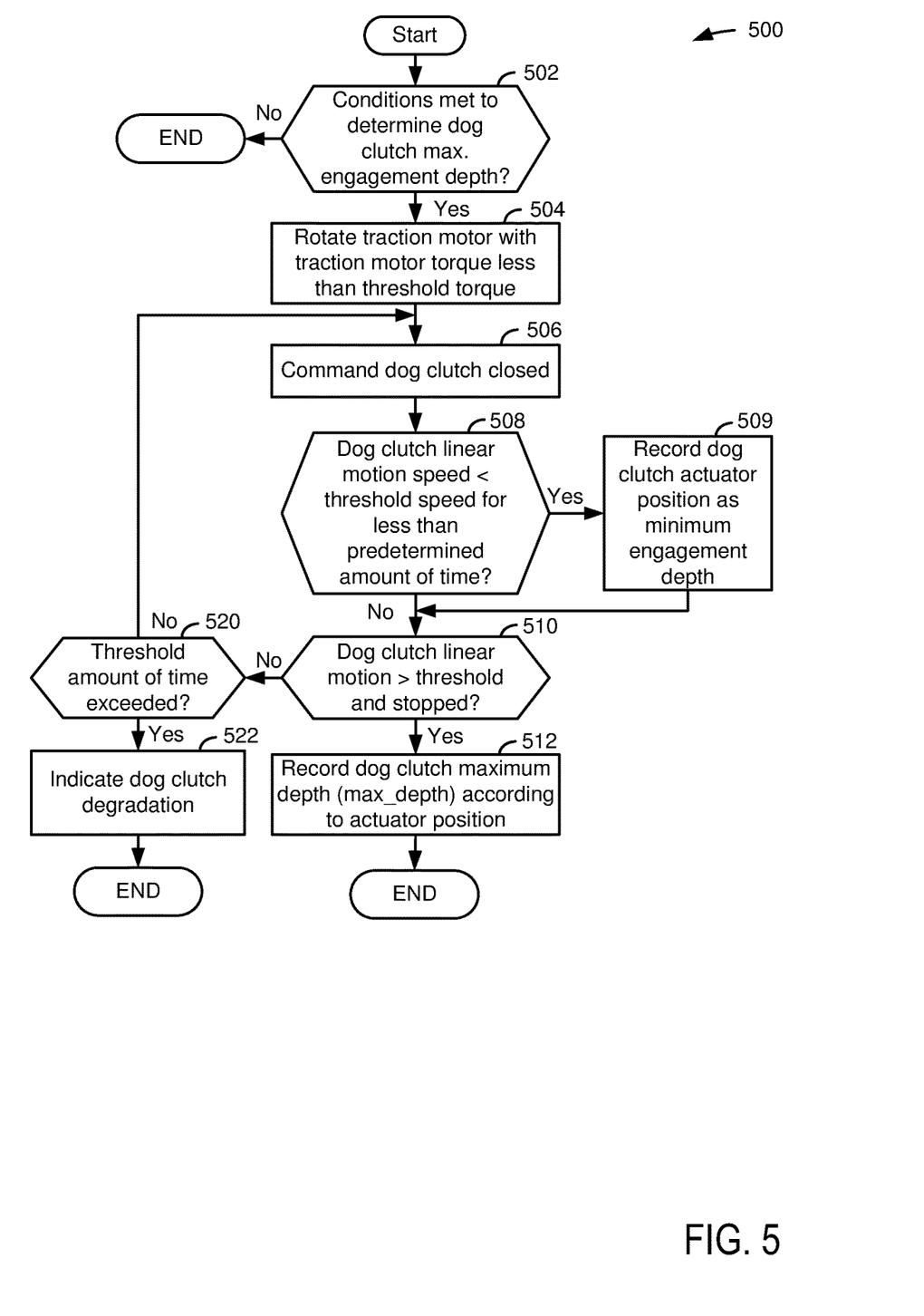
Figure 7:
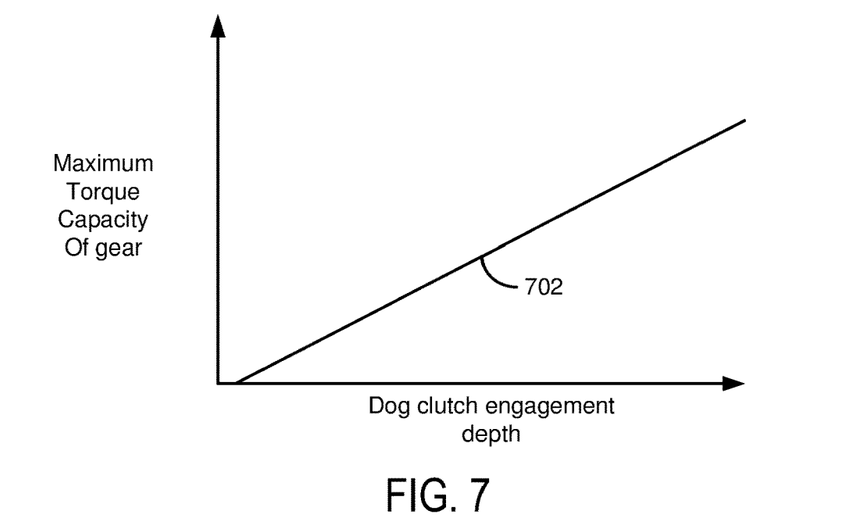
FIG. 7 shows a relationship between dog clutch engagement depth and maximum torque capacity of a gear.

At 404, method 400 determines an engagement depth for the dog clutch of a presently engaged transmission gear. In one example, the engagement depth is based on a minimum engagement dept (mindepth) that may be determined by the method of FIG. 5. The engagement depth may be determined via the following equation:

$$Engagedepth = presdepth - mindepth$$

where Engagedepth is the depth that teeth of dog clutch protrude into teeth of the gear that is being engaged as shown in FIG. 7, mindepth is a dog clutch actuator position where teeth of the dog clutch may first contact teeth of gear being engaged when the dog clutch is being closed, and presdepth is the present dog clutch actuator position. Alternatively, the engagement depth may be determined based on a maximum dog clutch engagement depth (max_depth) that may be determined by the method of FIG. 5. In particular, the engagement depth may be determined via the following equation:

$$Engagedepth = (maxdepth - mindepth) - (maxdepth - presdepth)$$

where Engagedepth is the depth that teeth of the dog clutch protrude into teeth of the gear that is being engaged as shown in FIG. 7, maxdepth is a dog clutch actuator position where protrusion of teeth of the dog clutch into teeth the gear being engaged is a maximum, mindepth is a dog clutch actuator position where teeth of the dog clutch may first contact teeth of the gear that is being engaged when the dog clutch is being closed, and presdepth is the present dog clutch actuator position. Method 400 proceeds to 406 after the engagement depth of the dog clutch is determined.

At 406, method 400 determines a temperature of oil in the transmission. The transmission oil temperature may affect the total amount of torque that may be transferred via a gear. The transmission oil temperature may be determined via a sensor. Method 400 proceeds to 408.

At 408, method 400 determines a temperature of an inverter that supplies electrical energy to the electric machine. The inverter temperature may affect the total amount of torque that may be transferred via a gear. The inverter temperature may be determined via a sensor. Method 400 proceeds to 410.

At 410, method 400 determines a traction motor (e.g., electric machine) temperature. The traction motor temperature may affect the total amount of torque that may be transferred via a gear. The traction motor temperature may be determined via a sensor. Method 400 proceeds to 412.

At 412, method 400 determines a maximum torque capacity for the presently engaged transmission gear. In one example, method 400 determines the maximum torque capacity for the present engaged transmission gear by referencing or indexing a table or function that describes a relationship between the maximum torque capacity of the presently engaged gear and the dog clutch engagement depth. The dog clutch engagement depth is indicative of an amount of surface area contact between teeth of the dog clutch and teeth of the gear that is being engaged. Thus, the torque capacity of the gear is a function of the depth of engagement of the dog clutch and the area of contact between the dog clutch teeth and gear teeth. FIG. 7 shows an example relationship between dog clutch engagement depth and transmission gear torque capacity. Method 400 references the table or function and the table or function outputs the transmission gear torque capacity. The values in the table or function may be empirically determined via applying a load to the dog clutch at different depths of dog clutch engagement or via a model. Method 400 proceeds to 414.

At 414, method 400 determines a maximum limited torque capacity for the presently engaged transmission gear. In one example, method 400 determines the maximum limited torque capacity for the presently engaged transmission gear via the following equation:

$$\text{Maxlimgeartor} = \text{Maxgeartor} - f(\text{oiltemp}) - g(\text{invtemp}) - h(\text{mottemp}) - \text{offset}$$

where Maxlimgeartor is the maximum limited gear torque, Maxgeartor is the maximum gear torque from step 412, f is a function that modifies maximum gear torque according to oil temperature, oiltemp is the transmission oil temperature, g is a function that modifies the maximum gear torque according to inverter temperature, invtemp is the inverter temperature, h is a function that modifies the maximum gear torque according to motor temperature, mottemp is the motor temperature, and offset is an offset value that may be applied to further limit the maximum limited gear torque. The functions f, g, and h may be empirically determined via loading the gear at different transmission oil temperatures, inverter temperatures, and motor temperatures. Method 400 proceeds to 416.

At 416, method 400 judges if the commanded driver demand torque as determined from driver demand pedal position or via a controller (e.g., an autonomous driver) is greater than the maximum limited gear torque. If so, the answer is yes and method 400 proceeds to 418. Otherwise, the answer is no and method 400 proceeds to 430. This operation seeks to keep the amount of torque that is transferred though a gear to be less than the gears torque capacity so that a possibility of physically degrading a gear may be lowered.

At 430, method 400 maintains the presently engaged gear in an engaged state to follow a baseline transmission shift schedule. Thus, no mitigating efforts to control gear torque are provided in this step. Method 400 proceeds to exit.

At 418, method 400 optionally communicates the maximum limited gear torque to the vehicle controller or other controller. The vehicle controller may take mitigating actions based on the maximum limited gear torque. For example, the vehicle controller may change a vehicle operating mode and/or notify the user of a limited gear torque. Method 400 proceeds to 420.

At 420, method 400 indicates that the presently engaged gear is operating in a degraded state. The gear that is operating in a degraded state may be displayed for the user to review via a human/machine interface. Method 400 proceeds to 422.

At 422, method 400 mitigates the maximum limited gear torque for the presently engaged gear. In one example, method 400 may upshift or downshift to a different gear so that the driver demand torque may be met. For example, if the commanded torque is greater than the maximum limited torque of third gear, the transmission may be downshifted to second gear or upshifted to fourth gear so that the driver demand torque may be provided by the vehicle. In some examples, method 400 may temporarily inhibit engagement of a gear that is determined to be degraded. Method 400 proceeds to exit.

Referring now to FIG. 5, a method for determining minimum and maximum dog clutch engagement positions is shown. The method of FIG. 5 may be at least partially implemented as executable instructions stored in controller memory in the system of FIGS. 1 and 2. Further, the method may include actions taken in the physical world to transform an operating state of the system of FIGS. 1 and 2. Additionally, the method may cooperate with the method of FIG. 4. The method of FIG. 5 may be executed in response to the vehicle being coupled to an electric power grid while the vehicle is stationary. In addition, the method may be executed when the vehicle is moving and traveling on a road.

At 502, method 500 judges whether or not conditions for determining dog clutch minimum and maximum engagement depths have been met. If so, the answer is yes and method 500 proceeds to 504. Otherwise, the answer is no and method 500 proceeds to exit. Conditions may include, but are not limited to the vehicle being plugged into a power grid or the vehicle traveling on a road at a constant speed.

At 504, method 500 rotates the electric machine (e.g., traction motor) at speed that is equal to or above the speed that a gear of the transmission is rotating. The electric machine is adjusted to this speed to facilitate engaging a gear. If the vehicle is plugged into a stationary power grid and not moving, the electric machine may be rotated at a slow speed. Method 500 proceeds to 506.

At 506, method 500 commands a dog clutch actuator to close a dog clutch. In one example, the dog clutch actuator is a linear actuator (e.g., a solenoid or a stepper motor with linear output) that extends and retracts shift forks to engage and disengage the dog clutch. The position of the dog clutch actuator is indicative of a position of the dog clutch. The position of the actuator and its speed is monitored via a sensor and a controller. Method 500 proceeds to 508.

At 508, method 500 judges whether or not the speed of the dog clutch is less than a threshold speed for less than a threshold amount of time after the dog clutch actuator began moving. If so, the answer is yes and method 500 proceeds to 509. If not, the answer is no and method 500 proceeds to 510. An answer of yes may be indicative that the dog clutch teeth of the dog clutch have run into the teeth of the gear that is being engaged. The position of the dog clutch actuator where the dog clutch actuator speed went to zero briefly may be the minimum engagement depth for the dog clutch actuator and the dog clutch.

At 509, method 500 records the position of the dog clutch actuator where the dog clutch actuator speed was briefly zero as the minimum engagement depth for the dog clutch actuator and dog clutch. Alternatively, the minimum engagement depth for the dog clutch actuator and dog clutch may be input by the transmission actuator into controller memory. Method 500 proceeds to 510.

At 510, method 500 judges whether or not the dog clutch actuator linear motion position is greater than a threshold position and stopped at a position that is beyond the threshold position. If so, the answer is yes and method 500 proceeds to 512. Otherwise, the answer is no and method 500 proceeds to 520.

At 520, method 500 judges whether or not a threshold amount of time has passed since the dog clutch actuator was most recently commanded to close to the dog clutch. If so, the answer is yes and method 500 proceeds to 522. Otherwise, the answer is no and method 500 returns to 506.

At 522, method 500 indicates that the dog clutch is degraded. The dog clutch may be indicated as degraded during conditions where the dog clutch actuator does not extend beyond a threshold distance, thereby indicating that the dog clutch has not engaged. Method 500 proceeds to exit.

At 512, method 500 records the position of the dog clutch actuator where the dog clutch actuator speed is briefly zero as the maximum engagement depth for the dog clutch actuator and dog clutch. Method 500 proceeds to exit.

In this way, the minimum and maximum dog clutch engagement depths may be determined. The minimum and maximum engagement depths may be determined when the vehicle is stationary and coupled to an electric grid so that battery power may be conserved. Further, the minimum and maximum engagement depths may be determined with higher accuracy when the vehicle is stationary.

Thus, the methods of FIGS. 4 and 5 provide for a method for operating a vehicle, comprising: via a controller, shifting from a first gear to a second gear in response to a commanded torque being greater than a torque capacity of the first gear, where the torque capacity of the first gear is based on an amount of overlap between teeth of the first gear and teeth of a dog clutch. In a first example, the method includes wherein the second gear is a numerically lower gear than the first gear. In a second example that may include the first example, the method includes wherein the second gear is a numerically higher gear than the first gear. In a third example that may include one or both of the first and second examples, the method includes wherein the torque capacity of the first gear includes an offset torque. In a fourth method that may include one or more of the first through third methods, the method includes wherein the amount of overlap is based on a maximum dog clutch engagement depth. In a fifth method that may include one or more of the first through fourth methods, the method further comprising holding the first gear engaged in response to the commanded torque being less than the torque capacity of the first gear. In a sixth example that may include one or more of the first through fifth methods, the method further comprises indicating degradation of the first gear in response to the commanded torque being greater than the torque capacity of the first gear.

Figure 6:
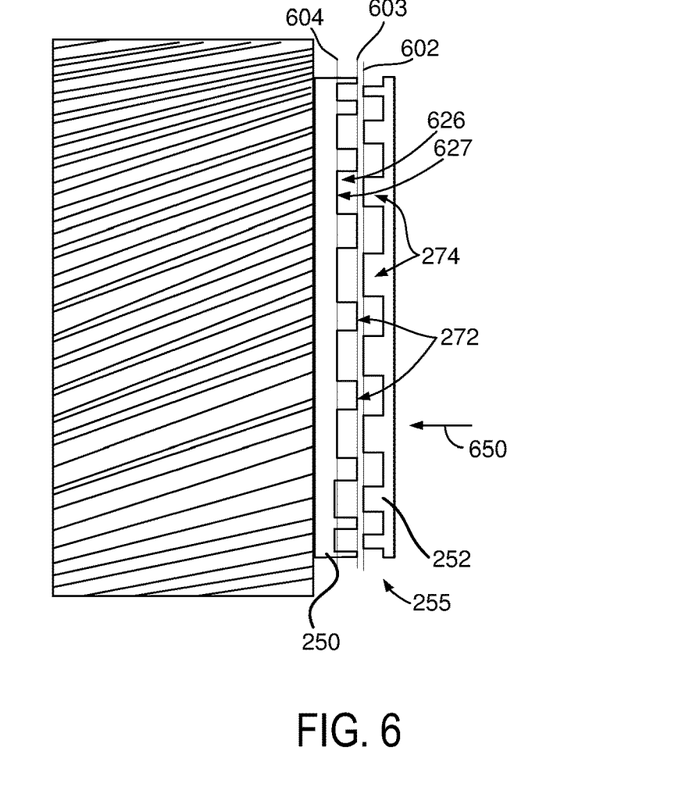
FIG. 6 shows a sketch of dog clutch engagement depths.

Referring now to FIG. 6, a sketch of minimum and maximum engagement depths for a dog clutch is shown. Second half 250 of first dog clutch 255 is shown coupled to first gear 202. First half 252 of first dog clutch 255 may be coupled to a transmission shaft and adjusted via shift forks (not shown). Ends of teeth 274 of first half 252 of first dog clutch 255 lie in a plane that is indicated by line 602. Ends of teeth 272 of second half 250 of first dog clutch 255 lie in a plane that is indicated by line 604. The first dog clutch 255 is at a minimum engagement depth when ends of teeth 274 align with ends of teeth 272 after the first half 252 of dog clutch 255 has moved in a direction indicated by arrow 650. The first dog clutch 255 is at a maximum engagement depth when ends of teeth 274 align with line 604, which is a deepest area of the cavity 626 between teeth 272. The teeth of the first dog clutch 255 may impinge on the second half 250 of first dog clutch at an end stop 627 of cavity 626.

Referring now to FIG. 7, a relationship between a dog clutch engagement depth for a transmission clutch and a maximum torque capacity of the gear is shown. The vertical axis represents the maximum torque capacity of a gear. The horizontal axis represents an engagement depth of a dog clutch. Line 702 represents maximum torque capacity of a gear as a function of depth of engagement for the dog clutch. FIG. 7 shows a greater torque capacity for a greater depth of dog clutch engagement. This relationship is due to the dog clutch teeth of one half of the dog clutch having greater overlap with the dog clutch teeth of a second half of the dog clutch. The greater depth of engagement increases the surface area contact between the two halves of the dog clutch, thereby increasing torque capacity of the gear that is selectively coupled to a transmission shaft via the dog clutch.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
   a transmission including a dog clutch and a gear, the dog clutch including dog clutch teeth, the gear including gear teeth that may be selectively engaged to the dog clutch teeth; and
   a controller including executable instructions that when executed cause the controller to selectively indicate degradation of the gear according to a commanded torque being greater than a torque capacity of the gear.

2. The vehicle system of claim 1, wherein the commanded torque is based on a driver demand.

3. The vehicle system of claim 2, wherein the commanded torque is input to the gear via an electric machine.

4. The vehicle system of claim 1, wherein the torque capacity of the gear includes an offset torque.

5. The vehicle system of claim 1, wherein the torque capacity of the gear is based on a depth of engagement of the dog clutch teeth with the gear teeth.

6. The vehicle system of claim 5, wherein the torque capacity of the gear increases as the depth of engagement increases.

7. The vehicle system of claim 6, wherein the torque capacity of the gear is further based on a temperature.

8. The vehicle system of claim 7, wherein the temperature is an oil temperature.

9. A method for operating a vehicle, comprising:
   via a controller, shifting from a first gear to a second gear in response to a commanded torque being greater than a torque capacity of the first gear, where the torque capacity of the first gear is based on an amount of overlap between teeth of the first gear and teeth of a dog clutch.

10. The method of claim 9, wherein the second gear is a numerically lower gear than the first gear.

11. The method of claim 9, wherein the second gear is a numerically higher gear than the first gear.

12. The method of claim 9, wherein the torque capacity of the first gear includes an offset torque.

13. The method of claim 9, wherein the amount of overlap is based on a maximum dog clutch engagement depth.

14. The method of claim 9, further comprising holding the first gear engaged in response to the commanded torque being less than the torque capacity of the first gear.

15. The method of claim 9, further comprising indicating degradation of the first gear in response to the commanded torque being greater than the torque capacity of the first gear.

16. A vehicle system, comprising:
   a transmission including a dog clutch and a gear, the dog clutch including dog clutch teeth, the gear including gear teeth that may be selectively engaged to the dog clutch teeth; and
   a controller including executable instructions that when executed cause the controller to shift the transmission in response to a commanded torque being greater than a torque capacity of the gear.

17. The vehicle system of claim 16, further comprising estimating a maximum engagement depth of the dog clutch in response to a vehicle being electrically coupled to a stationary power grid.

18. The vehicle system of claim 16, further comprising estimating a maximum engagement depth of the dog clutch while a vehicle is moving.

19. The vehicle system of claim 16, where the torque capacity of the gear is based on an engagement depth of the dog clutch.

20. The vehicle system of claim 19, where the engagement depth of the dog clutch is based on a maximum engagement depth.

* * * * *